June 29, 1965     A. FEIBUSH     3,191,614
SAFETY DEVICE FOR BRAKING SYSTEMS
Filed June 24, 1963
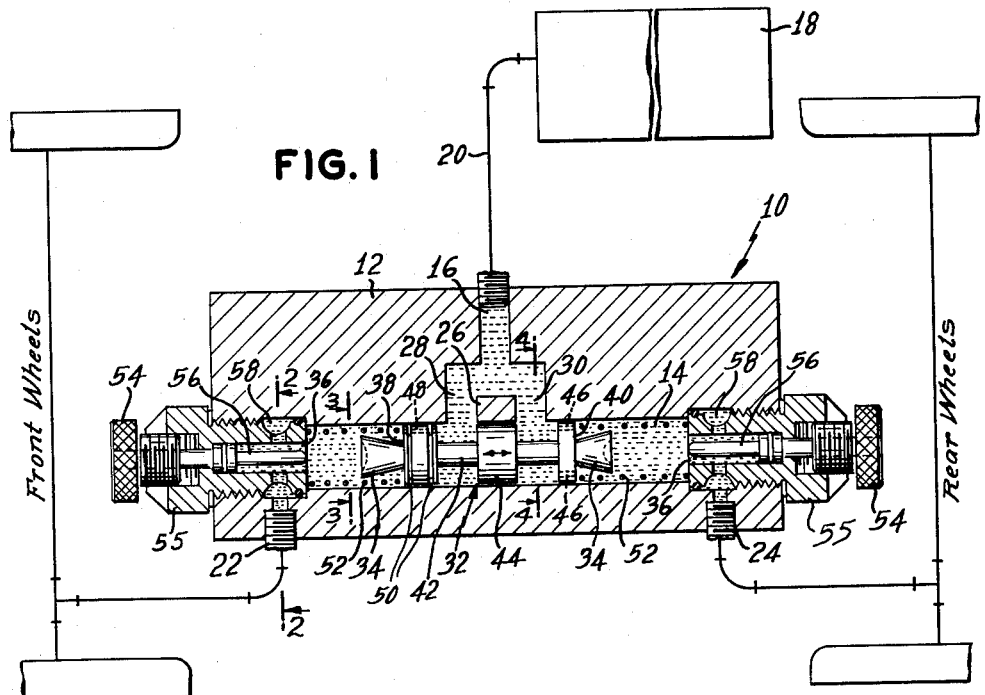
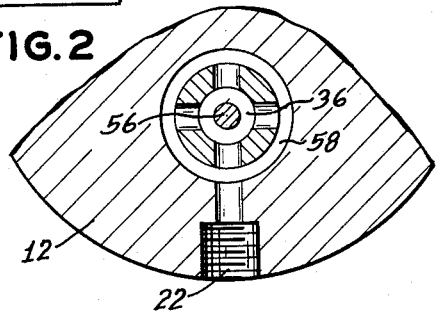
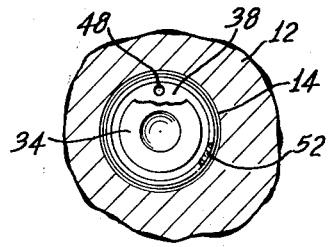
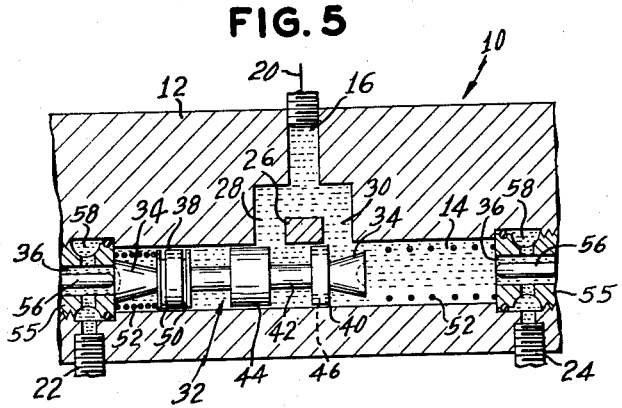
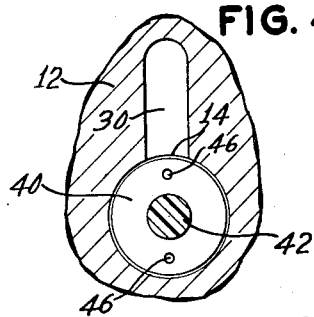
INVENTOR.
ALEXANDER FEIBUSH
BY *Jerome Bauer*
ATTORNEY

United States Patent Office 3,191,614
Patented June 29, 1965

3,191,614
SAFETY DEVICE FOR BRAKING SYSTEMS
Alexander Feibush, Plainview, N.Y., assignor to Alex Manufacturing Corporation, Jamaica, N.Y., a corporation of New York
Filed June 24, 1963, Ser. No. 290,004
6 Claims. (Cl. 137—118)

This invention relates to braking systems and more particularly to safety devices for braking systems employed in such vehicles as heavy trucks, buses and the like of the type disclosed in copending application Serial No. 136,661, filed September 7, 1961, now Letters Patent No. 3,134,391.

During the operation of a contained fluid pressure system of the type that is normally employed in the operation of vehicular brakes, it is important to be able to sense and immediately prevent the loss of brake fluid since any such loss results in the inability of the system to deliver sufficient fluid pressure to the brakes for their proper functioning. This problem is particularly acute in trucks, buses and other heavy vehicles that require massive braking forces to slow the momentum of the vehicle to a stop.

The present invention is directed toward a solution of this problem with special reference to those problems encountered in such heavy vehicles. Accordingly, because the sets of front and rear wheel brakes in such vehicles require materially different volumes of braking fluid for their operation, an object of the invention is to provide a safety device in which the fluid inlet introducing fluid from the master brake cylinder is so divided as to divert fluid to each of the sets of brakes along separate paths in the safety device.

Another object is to provide a unique arrangement of structure whereby the greater volume of fluid directed to one set of brakes for their operation does not accidentally result in presenting a false signal that will close the fluid line to any of the brakes at undesired times.

Still another object of the invention is to provide a safety device in which there is a valve member whose sensitivity of operation is such that the same need not initially overcome any force acting upon it other than that of the operating brake fluid thereby rendering the valve extremely sensitive to rapidly block or close off the loss of brake fluid through the defective portion of the braking system only when the same occurs while at the same time permitting the remaining portion of the system to function normally.

Other and further objects of this invention reside in the structures and arrangements hereinafter more fully described with reference to the accompanying drawings in which:

FIG. 1 is a plan view of a braking system illustrating a cross-section of the safety device constructed according to the teaching of the invention and showing the parts thereof in a normal position of operation or equilibrium, FIG. 2 is a cross-section of FIG. 1 taken along lines 2—2, FIG. 3 is a cross-section of FIG. 1 taken along lines 3—3, FIG. 4 is a cross-section of FIG. 1 taken along lines 4—4, FIG. 5 is a cross-section of a portion of the safety device of FIG. 1 illustrating the position of the parts thereof when a failure has occurred in one of the brake lines.

Referring now to the drawing, the safety device thereshown is generally identified by the numeral 10. It includes a housing member 12 having a fluid chamber 14. The fluid chamber is provided with a fluid inlet 16 that is connected with a master brake cylinder 18 by way of a fluid conduit 20. The fluid chamber 14 serves as a communication for the inlet fluid to a pair of fluid outlets 22 and 24 each of which is connected with a respective set of front and rear wheel brakes as diagrammatically shown in FIG. 1.

The housing 12 includes a divider wall 26 which is positioned in the path of the fluid inlet 16. The wall 26 effectively divides the direction of movement of the inlet fluid as the same enters the chamber 14 into two passageways 28 and 30. Located within the chamber 14 is a movable valve member that is generally identified by the numeral 32. In practice, the valve member 32 is constructed of a plastic material, the specific gravity of which compares with that of the braking fluid such that the valve member is always buoyantly immersed in the fluid to move as an integral part or particle of and with the fluid in the stream thereof. Hence, it may be said that the valve member 32 is substantially of the same specific gravity as that of the braking fluid so that it is neither more buoyant than the fluid nor heavier than the fluid, thereby assuring that it will constantly remain submerged and immersed fully within the fluid. Since it is not more bouyant than the fluid, it does not float to the top. Because it is not substantially more dense or heavier than the fluid, it will not fall to the bottom. Therefore, it may be said to move as any other particle which comprises the fluid.

The valve member 32 is elongated in length to fit within the elongated chamber 14. It includes a pair of closure ends 34 each of which is adapted to fit over and close a corresponding fluid outlet passage 36 that communicates with a respective one of the fluid outlets 22 and 24. Adjacent each closure end is a valve head 38 and 40 both of which are circular and smaller than the circular opening of the chamber 14, thereby permitting the fluid communicating between the inlet 16 and the outlets 22 and 24 to move thereabout. The valve heads are connected together by a stem 42 that includes a separator means or wall 44. Like the valve heads 38 and 40, the wall 44 is smaller than that of the chamber 14 thereby providing a small fluid by-pass around it and between it and the wall 26 of the housing with which it is normally aligned.

The valve head 40 is provided with a plurality of fluid by-passes in the form of holes 46 whereas the valve head 38 is provided with but a single fluid by-pass or hole 48. The presence of the greater number of fluid by-passes 46 in the head 40 materially reduces the fluid pressure responsive surface area of the head against which fluid will act. Hence, the fluid normally will apply greater forces against the surfaces of the valve head 38 than against the surfaces of the valve head 40. However, in practice, the surfaces of the separator wall 44 are acted upon by the moving fluid when there is a defect in any one of the brake lines. Hence, the surfaces of the separator wall 44 actually add additional areas against which the fluid acts thereby causing the valve to become more acutely sensitive to unbalanced fluid forces.

When the valve member 32 is in its position of equilibrium as shown in FIG. 1, the valve separator wall 44 is aligned with the housing wall 26 and effectively divides the passage of the inlet fluid into the two passageways 28 and 30 causing the fluid to move in the direction of each of the heads 38 and 40 equally. Because the valve member 32 is substantially of the same specific gravity as the fluid, it is normally uneffected by deleterious or erroneous forces such as centrifugal and centripital forces acting upon it during violent or erratic movements of the vehicle. Included within the chamber 14 is a pair of buffer springs 52. The springs 52 are held in seated position against the walls of each of the fluid outlet passages 36. They are normally fully expanded and are free from engagement with the facing surfaces of the valve heads 38 and 40. Consequently, the springs 52 do not bear on or apply any restrictive forces against the valve heads when the valve member 32 is in its position of equilibrium as shown in FIG. 1. Therefore, they do not restrict the initial movement of the valve member when the same moves in response to an unequal fluid pressure applied against the surfaces of the valve heads 38 and 40 thereof.

When it is desired to operate the brakes, fluid is caused to move under pressure from the master cylinder 18 along the conduit 20 into the fluid inlet 16 of the housing 12. At that point, it is equally divided by the wall 26 for movement along the two passageways 28 and 30. This division is further effected and completed by the separator wall 44 of the valve member 32. The fluid is then moved separately to act against, to move about and through the by-pass in the heads 38 and 40 to flow to the brakes through the respective fluid outlets 22 and 24 by way of passages 36 and annular passages 58. During normal operation, a greater volume of braking fluid must be moved through the outlet 24 to the larger rear wheel brakes than is required to be moved through the outlet 22 to the smaller front wheel brakes.

It will be realized that because of the differential in volume of fluid that must be moved through the two outlets 22 and 24, there is a possible short period during which an unbalancing of fluid forces acts on the valve heads 38 and 40. These unbalanced fluid forces could cause an undesirable and erroneous sensing by the valve 32 that could cause the same to move in the direction of the fluid outlet 24 thereby tending to close its corresponding passage 36. Hence, it is necessary that a false sensing arrangement be built into the valve structure 32 such that it will be prevented or restrained from movement in the direction of the outlet 24 until such time as the rear wheel brakes have received sufficient fluid that the fluid pressure in the front and rear wheel brake lines 22 and 24 is equalized.

This false sensing is accomplished in the present invention in a number of ways. The numerous by-passes 46 provided in the valve head 40 materially reduces the surface area of such valve head such that its effective surface area is smaller than the valve head 38. Hence, the fluid force acting on the valve head 40 is materially smaller than that acting on the valve head 38 tending to retain the valve in its position of equilibrium. In addition, the valve head 40 is shorter in length than that of the valve head 38 so that fluid can move thereabout more rapidly than it can about the longer head 38 thereby permitting a faster flow of fluid to the outlet 24 than to the outlet 22. Further, the valve head 38 is provided with a false sensing construction as effected by the grooves 50. Hence, as the fluid moves about the longer length of the head 38, it turbulently eddy currents in the groove 50 creating a drag between the head 38 and the surrounding wall of the chamber 14 providing a drag on the valve that tends to restrain the valve from movement in the direction of the fluid outlet 24.

A similar drag is provided on the valve at the separator wall 44 at the restricted passageway defined between such wall and the adjacent surface of the chamber 14 and the housing wall 26. The fluid trapped between the separator wall 44 and the chamber wall 14 and the wall 26 provides a fluid lock that effects a drag on the wall 44 initially restricting its movement toward the fluid outlet 24. The drag created on the valve 32 restraining its movement in the direction of the fluid outlet 24 is sufficiently long in time to delay it until the amount of fluid in the front and rear wheel brakes become equalized. Thereafter, the equalized fluid forces act on the valve heads 38 and 40 and on the surfaces of the separator wall 44 to retain the valve in its position of equilibrium as shown in FIG. 1.

In the event a break should occur in one of the lines such as one of the lines of the front wheel brakes, there will immediately occur a decrease in fluid pressure in the direction of the outlet 22 resulting from the loss of fluid in the line thereof. This results in an unbalancing of the fluid forces acting against the surfaces of the heads 38 and 40 and the separator wall 44. As the fluid moves from the inlet 16 into the chamber 14, it flows in the direction of the least resistance namely, in the direction of the break in the fluid outlet line 22. There is a consequent application of unequal fluid pressure against the surface areas of the head 38 and the separator wall 44 that immediately moves the valve member 32 in the direction of the lower fluid pressure. Inasmuch as the spring 52 adjacent the head 38 does not initially apply a force or resistance against such valve head, the valve 32 senses the lower fluid pressure and immediately moves unhampered in the direction to close the defective fluid outlet.

The closing movement of the valve is now aided by the additional fluid pressure in the passageway 30 acting against the adjacent surface of the separator wall 44 while at the same time fluid pressure is applied through the passageway 28 against the surfaces of the valve head 38. Thus, the effective surface area of the valve head 38 is increased and multiplied by the effective surface area of the separator wall 44 against which fluid pressure is now being applied. The valve quickly moves to close the fluid outlet 36 and is retained in this position by the application of fluid pressure through the passageway 28 acting against the separator wall 44, the surfaces of the valve head 38 and also against the surfaces of the valve head 40 by way of the passageway 30 as illustrated in FIG. 5. The valve will remain in its closed position as shown in FIG. 5 until the defect is repaired.

After the defect is repaired, it is necessary to bleed the fluid line. Bleeding is accomplished by hand turning the screw knob 54 in bushing 55 to project its pin 56 beyond the end of the fluid outlet passage 36 thereby physically displacing the valve closure end 34 from the passage 36 and permitting fluid to pass therebetween. This physical displacement of the valve 32 is also aided by the action of the buffer spring 52 acting against the head 38. Fluid then passes from the inlet 16 through the passageway 28, about and through the head 38, through the passage 36 and the connecting fluid passage 58 into the fluid outlet 22. After the defective line is repaired and the brakes are properly bled, the fluid pressure in the chamber 14 returns to a condition of equilibrium whereby all the fluid forces acting on all the surfaces of the valve heads 38, 40 and the separator wall 44 are equalized. At that time, the valve member 32 returns to its position of equilibrium as shown in FIG. 1 and is ready again for normal operation.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:

1. In a safety device for a braking system, a housing including a fluid inlet and fluid outlets, a chamber in said housing communicating fluid between said fluid inlet and said outlets, a valve movable in said chamber between a position of equilibrium wherein the same is spaced from said fluid outlets and wherein the same is in a position closing one of said fluid outlets, a plurality of surface means relatively spaced on said valve and spaced from said chamber to permit the passage of fluid thereabout, said surface means being acted upon by the fluid in said chamber to move said valve between said positions, said chamber having a wall and said valve having a separator between said surface means cooperating with said wall of said chamber to divide the fluid from said inlet into two passageways each of which directs inlet fluid only at a respective one of said plurality of said surface means and at a correspondingly directed side of said separator, said separator being smaller than said wall of said chamber and being spaced therefrom to enable the movement of the fluid thereabout and also from one of said surface means to the other to equalize the fluid pressure in said chamber.

2. In a safety device as in claim 1, said plurality of surface means each having different fluid pressure responsive areas, said surface means with the larger fluid responsive area having means defined thereon to create a fluid drag on said valve during the movement of fluid in the direction thereof.

3. In a safety device as in claim 1, said valve being of a density compared to that of the braking fluid such that the same is buoyantly immersed therein and moves as a part thereof.

4. In a safety device, a housing having a fluid chamber, a fluid inlet and a plurality of fluid outlets defined in said housing and communicating with each other through said chamber, a valve movable in said chamber and having a pair of relatively spaced heads each of which is smaller than said chamber to permit the fluid to flow thereabout between said fluid inlet and fluid outlets, means in said housing dividing the inlet fluid into two paths one for each of said heads, and separator means on said valve spaced between said heads cooperating with said housing means to divide the inlet fluid into said two paths in said chamber to direct the inlet fluid in each of said paths to each respective one of said heads and to a correspondingly directed side of said separator means as said valve moves toward one of said outlets, said separator means being smaller than said chamber to enable the fluid in said chamber to flow about said separator means from one of said heads to the other to equalize the fluid pressure in said chamber.

5. In a safety device as in claim 4, one of said heads having surfaces thereon creating a fluid drag on said valve during the movement of fluid through said chamber.

6. In a safety device, a housing, a fluid chamber, a fluid inlet communicating with said chamber, a pair of fluid outlets one at each end of said chamber, a valve movable in said chamber and being of a density such that the same is buoyantly immersed in the fluid in said chamber to move as a part thereof, a pair of heads spaced along said valve each to move the same in the direction of a respective one of said fluid outlets and each being smaller than said chamber to permit the flow of fluid thereabout, one of said heads having a larger fluid pressure responsive area than the other and including means to create a fluid drag to slow the movement of said valve toward its respective fluid outlet, and means on said valve cooperating with said housing to divide the path of fluid from said fluid inlet to direct the same to respective ones of said heads and including fluid pressure responsive areas, said areas on said dividing means and said areas on said heads being responsive to the pressure of the movement of the inlet fluid thereagainst to cause said valve to move in the direction of one of said fluid outlets.

References Cited by the Examiner
UNITED STATES PATENTS

| | | | |
|---|---|---|---|
| 1,571,396 | 2/26 | Darrow | 251—44 |
| 2,195,214 | 3/40 | Jacob. | |
| 2,534,871 | 12/50 | Lichtman | 137—118 |
| 2,921,440 | 1/60 | Feibush. | |
| 3,021,859 | 2/62 | Liantonio | 137—101 |
| 3,134,391 | 5/64 | Feibush | 137—118 |

M. CARY NELSON, *Primary Examiner.*

MARTIN P. SCHWADRON, *Examiner.*